United States Patent
Yamaguchi et al.

(10) Patent No.: US 7,172,042 B2
(45) Date of Patent: Feb. 6, 2007

(54) VEHICLE POWER CABLES RETAINING STRUCTURE

(75) Inventors: Hiroo Yamaguchi, Saitama (JP); Harumi Takedomi, Saitama (JP); Hiromitsu Sato, Saitama (JP); Yasuo Kitami, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 28 days.

(21) Appl. No.: 10/761,426

(22) Filed: Jan. 22, 2004

(65) Prior Publication Data

US 2005/0011687 A1    Jan. 20, 2005

(30) Foreign Application Priority Data

Jan. 22, 2003    (JP)    ............... 2003-013525

(51) Int. Cl.
    *B60K 1/00*    (2006.01)
(52) U.S. Cl. ............... 180/65.1; 180/65.3; 180/65.8; 180/65.4; 180/68.5
(58) Field of Classification Search ............... 296/280; 180/65.1–65.8, 68.5, 68.1; 280/78.2, 782; 440/6; 174/50
    See application file for complete search history.

(56) References Cited

U.S. PATENT DOCUMENTS

| | | | |
|---|---|---|---|
| 1,962,876 A | | 6/1934 | Reinert et al. |
| 6,220,380 B1 * | | 4/2001 | Mita et al. ............... 180/65.1 |
| 6,460,642 B1 * | | 10/2002 | Hirano ............... 180/65.1 |
| 6,674,000 B2 * | | 1/2004 | Lambiaso ............... 174/50 |
| 6,743,976 B2 * | | 6/2004 | Motzigkeit ............... 174/48 |
| 6,933,440 B2 * | | 8/2005 | Ichikawa et al. ............... 174/48 |

FOREIGN PATENT DOCUMENTS

| | | |
|---|---|---|
| DE | 19959575 A1 | 7/2001 |
| DE | 100 12 950 A 1 | 9/2001 |
| EP | 0543469 | 5/1993 |
| FR | 1 011 734 | 6/1952 |
| JP | SHO63-024919 | 2/1988 |
| JP | HEI01-102475 | 7/1989 |
| JP | 05-207610 | 8/1993 |
| JP | 11-180162 | 7/1999 |

OTHER PUBLICATIONS

Anonymous, "SILVYN EDU-AS/SILVYN AS Metallschutzschlauch für schwere mechanische Beanspruchung," XP-002274883, Lapp Kabel Katalog 2001, p. 530.

* cited by examiner

Primary Examiner—J. Allen Shriver
Assistant Examiner—Cynthia F. Collado
(74) Attorney, Agent, or Firm—Arent Fox PLLC

(57) ABSTRACT

High-tension cables 7U, 7V, 7W connect an inverter 6 disposed outside an engine compartment with a motor/generator 3 disposed in the engine compartment, the high-tension cables 7U, 7V, 7W are individually passed through metallic protection pipes 30 under a floor of a vehicle, the protection pipes 30 are supported from an underside of the floor, and the high-tension cables 7U, 7V, 7W are passed through a protection tube 20 over a predetermined distance from the motor/generator 3 in the engine compartment.

15 Claims, 8 Drawing Sheets

VEHICLE POWER CABLES RETAINING STRUCTURE

BACKGROUND OF THE INVENTION

The present invention relates to a vehicle power cables retaining structure.

A power cable for supplying power from a battery to a driving motor in an electric vehicle has relatively thick in diameter and is hence relatively heavy in weight.

Due to this, conventionally, as is disclosed in Patent Literature No, 1, for example, a plurality of power cables are fixed onto a floor, and the power cables so fixed are then surrounded all together by a protection cover which is formed by bending a plate material.

[Patent Literature No. 1]

JP-A-5-207610

However, in the event that the plurality of power cables are surrounded collectively by the protection cover in the conventional fashion, a large useless space is created within the protection cover, and this leaves a problem to be solved from a viewpoint of effective use of a space above the floor.

In addition, a route along which the power cables are laid out is not always simply linear but may become sometimes complex due to rises and bends, and in the event that the protection cover is attempted to be mounted along the power cables which are routed complexly, the protection cover itself has to be formed into a complex shape accordingly, and the formation of such a complexly shaped cover becomes difficult. Additionally, there occurs a case which requires the protection cover to be divided into a plurality of portions, and this makes troublesome the mounting of the protection cover so divided, the workability and productivity being thereby deteriorated.

SUMMARY OF THE INVENTION

Then, the invention is made to provide a vehicle power cables retaining structure which can provide an effective use of a space above the floor by laying out power cables along an underside of the floor and which can provide good workability and productivity even when the power cables are laid out along a complex route.

With a view to solving the problem, according to a first aspect of the invention, there is provided a vehicle power cables retaining structure for retaining power cables (for example, high-tension cables 7, 7U, 7V, 7W in the embodiment that will be described later on) laid out along an underside of a floor (for example, a floor 14 in an embodiment that will be described later on) of an electric vehicle (for example, a hybrid vehicle 1 in the embodiment that will be described later on), wherein the power cables are individually passed through metallic protection pipes (for example, protection cables 30 in the embodiment that will be described later on), and the metallic protection pipes are then retained on the underside of the floor of the vehicle.

According to the construction, the power cables can be simply laid out along the underside of the floor of the vehicle. In addition, the protection pipes protects the power cables against jumping pebbles and splashed water. Furthermore, since the protection pipes have the rigidity, the protection pipes prevent the deflection of the power cables. The protection pipes cut off the conduction of heat from the outside so as to protect the power cables against a damage that would be caused by heat. Since the protection pipes have an electromagnetic shielding function, non-shielding cables can be used as the power cables.

According to a second aspect of the invention, there is provided a vehicle power cables retaining structure for retaining power cables (for example, 7, 7U, 7V, 7W in an embodiment that will be described later) laid out along an underside of a floor (for example, a floor 14 in the embodiment that will be described later on) of a hybrid vehicle (for example, a hybrid vehicle 1 in the embodiment that will be described later on) which is driven to run by an engine (for example, an engine 2 in the embodiment that will be described later on) and a motor (for example, a motor/generator 3 in the embodiment that will be described later on), wherein the power cables connect a power converter (for example, an inverter 6 in the embodiment that will be described later on) disposed outside an engine compartment (for example, an engine compartment 11 that will be described later on) with the motor disposed inside the engine compartment, wherein the power cables are individually passed through metallic protection pipes (for example, protection pipes 30 in the embodiment that will be described later on) under the floor, and the metallic protection pipes are then supported from the underside of the floor, and wherein, in the engine compartment, the power cables are passed through a flexible protection tube (for example, a protection tube 20 in the embodiment that will be described later on).

According to the construction, the power cables can be simply laid out along the underside of the floor of the hybrid vehicle. In addition, the protection pipes protects the power cables against jumping pebbles and splashed water. Furthermore, since the protection pipes have the rigidity, the protection pipes prevent the deflection of the power cables. The protection pipes cut off the conduction of heat from the outside so as to protect the power cables against a damage that would be caused by heat. Since the protection pipes have an electromagnetic shielding function, non-shielding cables can be used as the power cables.

On the other hand, since the portions of the power cables that are connected to the motor are passed through the flexible protection tube in the engine compartment, the connecting job of the power cables with the motor can be facilitated, and the vibration of the engine can be absorbed.

According to a third aspect of the invention, there is provided a vehicle power cables retaining structure as set forth in the second aspect of the invention, wherein the protection tube includes an iron corrugated tube or an iron flexible tube having a net-like shield portion.

According to the construction, an electromagnetic shielding function can be imparted to the protection tube, and non-shielding cables can be used as the power cables.

According to a fourth aspect of the invention, there is provided a vehicle power cables retaining structure as set forth in the first or second aspect of the invention, wherein the protection pipe is formed by being bent after the power cable is passed therethrough.

According to the construction, the power cables and the protection pipes can be formed simultaneously into a configuration that follows a route along which the power cables are laid out. In addition, since the power cable is passed through the protection pipe before the protection pipe is bent, the laying-out job of the power cables can be facilitated.

According to a fifth aspect of the invention, there is provided a vehicle power cables retaining structure as set forth in the first or second aspect of the invention, wherein the protection pipe is decreased in diameter by crimping an intermediate portion of the protection pipe along the length thereof.

According to the construction, the power cable can easily be disposed substantially on a central axis of the protection pipe.

According to a sixth aspect of the invention, there is provided a vehicle power cables retaining structure as set forth in the first or second aspect of the invention, wherein the protection pipe is divided into a plurality of protection pipes, the plurality of protection pipes so divided being connected to each other by an iron corrugated tube (for example, a corrugated tube 33 in the embodiment that will be described later on) or an iron flexible tube having a net-like shield.

According to the construction, a dimensional tolerance can be absorbed by the iron flexible tube by which the protection pipes are connected to each other.

According to a seventh aspect of the invention, there is provided a vehicle power cables retaining structure as set forth in any of the first to sixth aspect of the invention, wherein a refrigerant (for example, a cooling air in the embodiment that will be described later on) is allowed to flow through a gap (for example, a gap 32 in the embodiment that will be described later on) formed between the protection pipe and the power cable.

According to the construction, the power cables can be cooled, and the protection pipes can also be cooled.

According to an eighth aspect of the invention, there is provided a vehicle power cables retaining structure as set forth in the seventh aspect of the invention, wherein a fin (for example, a fin 34, 35, 36 in the embodiment that will be described later on) is provided on at least either of an inner surface or an outer surface of the protection pipe in such a manner as to protrude therefrom.

According to the construction, in the event that the fin is provided on the inner surface of the protection pipe, the contact surface with the refrigerant is increased, and the cooling effect on the protection pipe is increased. On the other hand, in the event that the fin is provided on the outer surface of the protection pipe, the contact area with air flowing the outside of the protection pipe is increased, and the cooling effect on the protection pipe is increased. In either of the cases, the high-tension cables 7 are made difficult to be subjected to heat from the outside. In addition, the fin increases the rigidity of the protection pipe.

According to a ninth aspect of the invention, there is provided a vehicle power cables retaining structure as set forth in the eighth aspect of the invention, wherein the fin has a T-shaped cross section.

According to the construction, the surface area of the fin can be increased.

DETAILED DESCRIPTION OF THE PREFERRED EMBODIMENTS

Referring to FIGS. 1 to 11, embodiments of vehicle power cables retaining structures according to the invention will be described below.

(First Embodiment)

Firstly referring to FIGS. 1 to 7, a first embodiment of a vehicle cable powers retaining structure according to the invention will be described.

Figure 1:
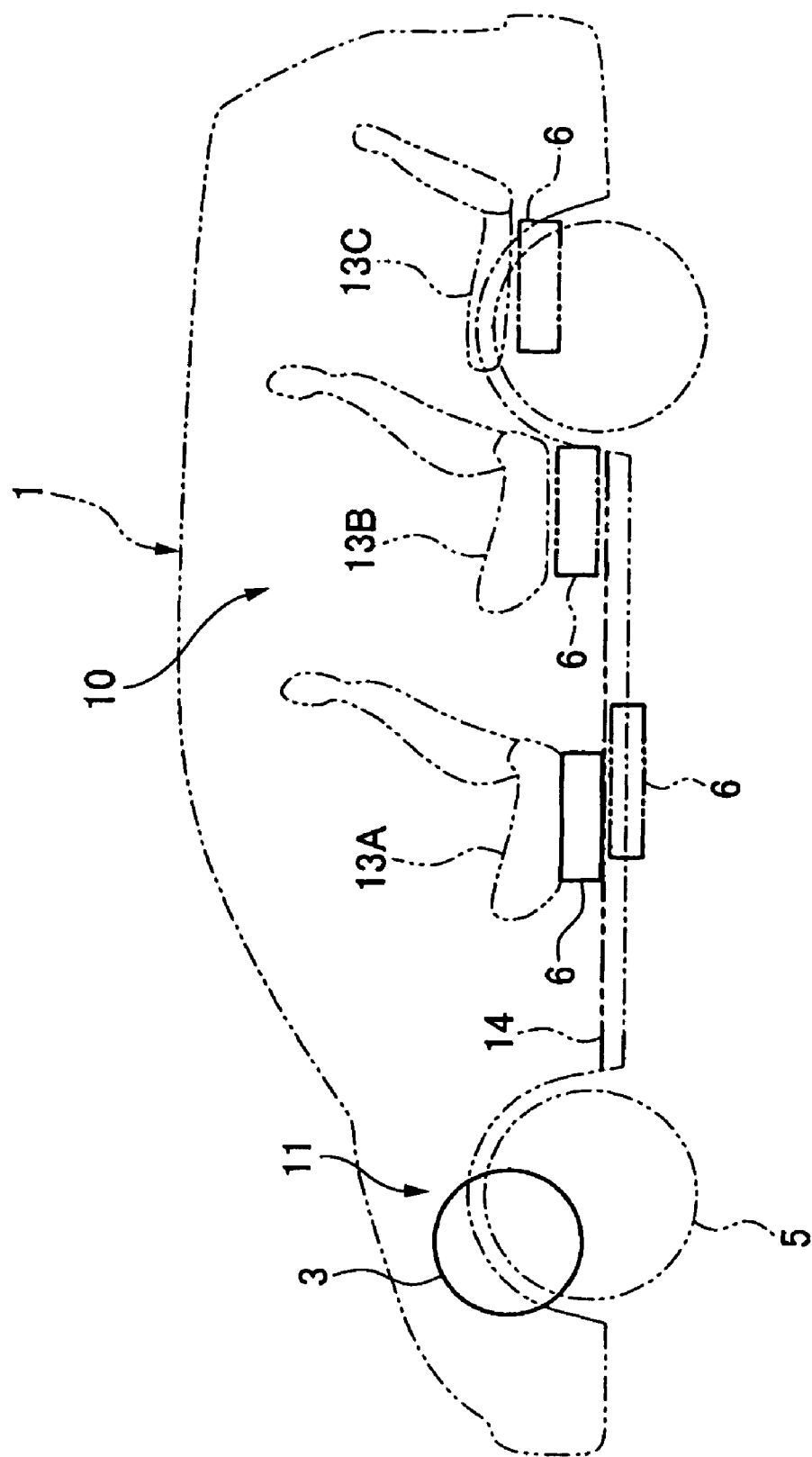
FIG. 1 is a vision through side view of a parallel-type hybrid vehicle 1 provided with a vehicle power cables retaining structure according to the invention.
Figure 2:
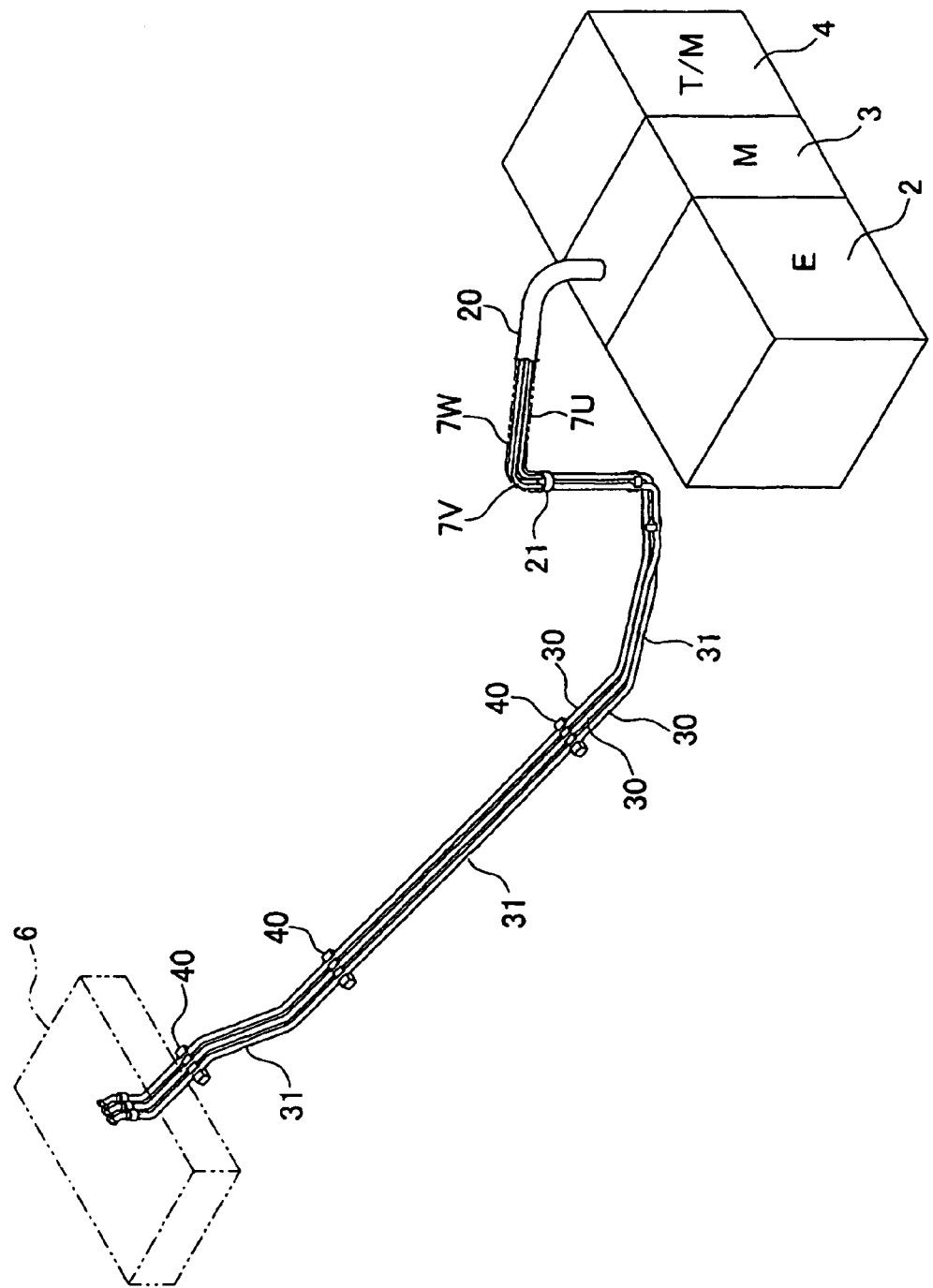
FIG. 2 is a perspective view of a first embodiment of a vehicle power cables retaining structure according to the invention.

FIG. 1 is a vision through side view showing a layout of a main construction of a parallel-type hybrid vehicle 1 provided with the vehicle power cables retaining structure, and FIG. 2 is a perspective view of the power cables retaining structure.

In this hybrid vehicle 1, an engine 2 and a motor/generator 3, which are sources of power, and an automatic transmission 4 are connected directly in series. The motor/generator 3 is a three-phase DC brushless motor, and the traction of the engine 2 and the motor/generator 3 is transmitted to front wheels 5, which are driving wheels, via the automatic transmission 4. In addition, in decelerating the hybrid vehicle 1, when the traction is transmitted from the front wheels 5, which are the driving wheels, to the motor/generator 3, the motor/generator 3 functions as a generator so as to generate a so-called regenerative braking force and recovers kinetic energy as electric energy. The recovered electric energy is stored in a high-tension battery (not shown) via an inverter (a power converter) 6.

The engine 2 and the motor/generator 3 are accommodated in an engine compartment 11 ahead of a passenger compartment 10, and in this embodiment, the inverter 6 is disposed under a first seat 13A which constitutes a driver's seat or a front-passenger seat, and the motor/generator 3 and the inverter 6 are connected by three-phase high-tension cables (power cables) 7U, 7V, 7W. Hereinafter, in a case where phases do not have to be distinguished specifically, the three-phase high-tension cables are generally referred to as "high-tension cables 7".

The high-tension cables 7 connected to the motor/generator 3 pass through an underside of a floor 14 from the engine compartment 11 and rises below the inverter 6 so as to be connected to the inverter 6.

Figure 3:
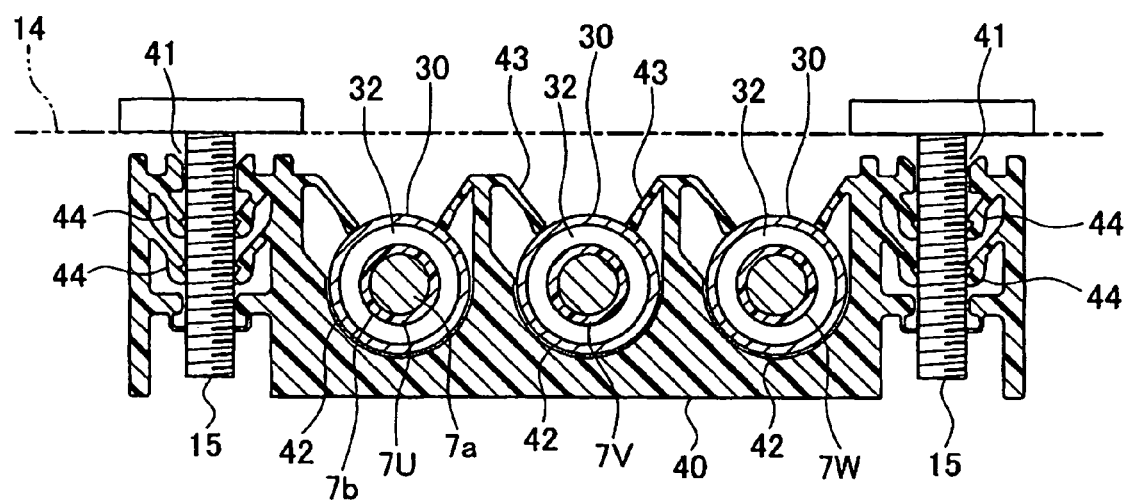
FIG. 3 is a cross-sectional view showing a state in which protection pipes are mounted in the first embodiment.

In this embodiment, as shown in FIG. 3, the high-tension cable 7 is made up of a so-called non-shielding cable formed by covering a conductor 7a with an insulating material.

In the engine compartment 11, the three-phase high-tension cables 7U, 7V, 7W are passed through a single flexible iron corrugated tube (a protection tube) 20 all together over a predetermined distance from the engine 2, and the high-tension cables 7U, 7V, 7W in the respective phases are individually passed through metallic (for example, aluminum) protection pipes 30 beyond a distal end of the corrugated tube and on the underside of the floor 14.

Figure 4:
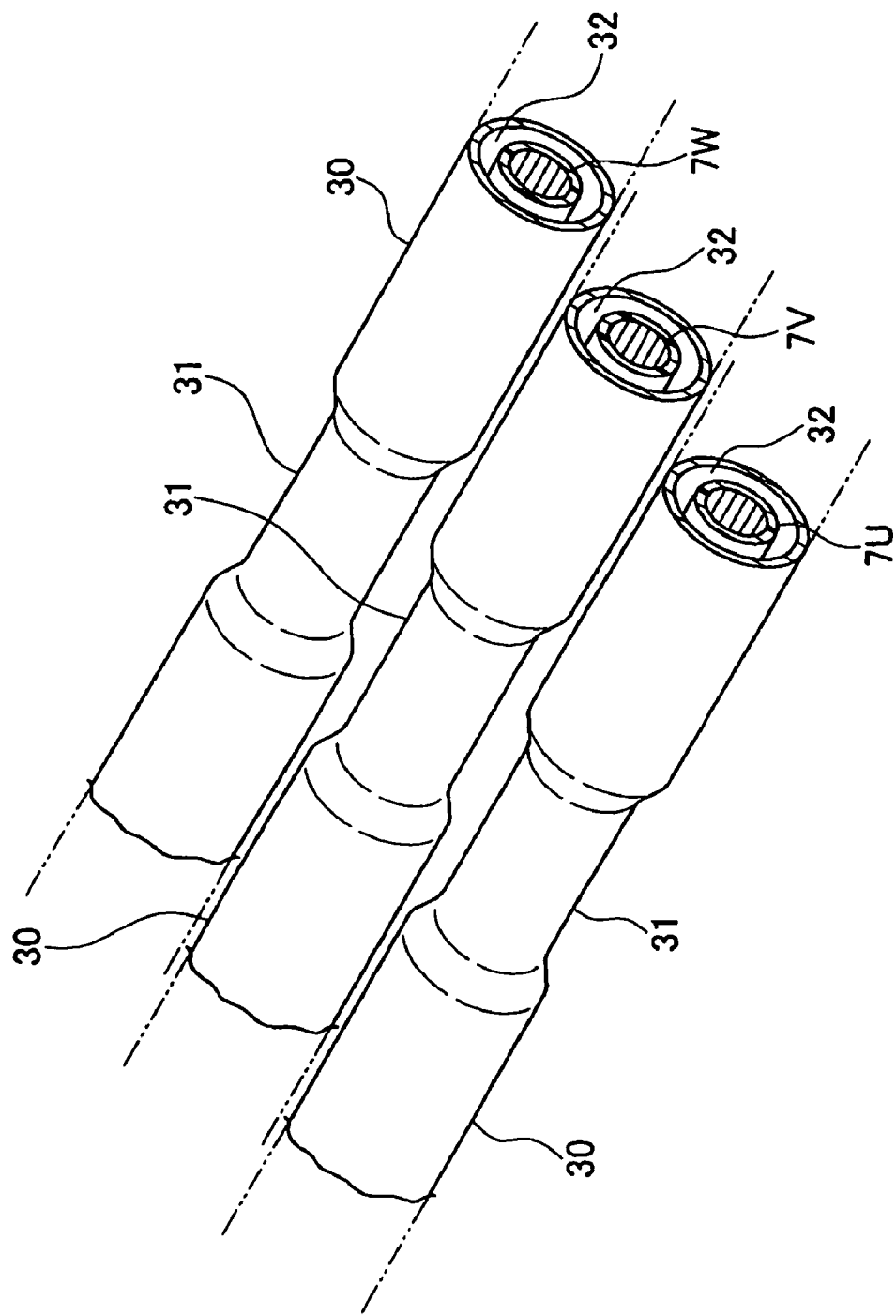
FIG. 4 is a perspective view showing crimped portions of the protection pipes in the first embodiment.

An inside diameter of the protection pipe 30 is set such that a gap of a predetermined dimension is produced between the high-tension cable 7 and the protection pipe 30 when the high-tension cable 7 is passed through the protection pipe 30, and the protection cable 30 is formed by being bent to a configuration of a route along which the high-tension cable 7 is to be laid out after the high-tension cable 7 is passed through the protection pipe 30 in advance. In addition, after the high-tension cable 7 is passed through the protection pipe 30 in advance, the protection pipe 30 is crimped to be decreased in diameter at a predetermined location thereof which is located at an intermediate position along the length of the route along which the high-tension cable 7 is laid out, as shown in FIG. 4, and an inner circumferential surface of the protection pipe 30 closely contact an outer circumferential surface of the high-tension cable 7 at the crimped portion 31, whereby the high-tension cable 7 is allowed to be disposed substantially on a central axis of the protection pipe 30, thereby making it possible to form a gap 32 around the high-tension cable 7 circumferentially equally.

Thus, since the protection pipe 30 is formed and worked, that is, bent and crimped after the protection pipe 30 is passed through the protection pipe 30, the workability can be improved markedly when compared with a case where the high-tension cable 7 is passed through the protection pipe 30 after the protection pipe 30 is bent and the like. In addition, since the high-tension cable 7 and the protection pipe 30 can be simultaneously formed into a configuration which follows a rough along which the high-tension cable 7 has to be laid out, the productivity can be enhanced to an extremely high level.

As shown in FIG. 3, the protection pipe 30 through which the high-tension cable 7 is already passed is laid out along the underside of the floor and is then supported on the floor 14 via a resin clip 40.

To describe in detail, a bolt engagement hole 41 having a plurality of locking claws 44 on an inner circumferential surface thereof is provided at each end of the clip 40, and three recessed fitting portions 42 into which the protection pipe 30 can fit are provided so as to be aligned in parallel between both the bolt engagement holes 41, 41. The recessed fitting portion 42 is made to open at a top thereof, and locking claws 43 are provided on both sides of the opening in such a manner as to approach each other as they extend inwardly.

The protection pipe 30 is forced into each fitting recessed portion 42 from the open side thereof while press compressing the locking claws 43. When a lower semi-circular portion of the protection pipe 30 reaches to lower ends of the locking claws 43, since the locking claws 43 attempt to return to their initial configuration by virtue of resiliency, the protection pipe 30 is then pushed into a bottom portion of the recessed fitting portion 42 by virtue of the resiliency of the locking claws 43. When the protection pipe 30 hits the bottom portion of the recessed fitting portion 42, the protection pipe 30 is firmly held by the bottom portion of the recessed fitting portion 42 and the locking claws 43, whereby the removal from the recessed fitting portion 42 is prevented.

After three protection pipes 30 are fitted into the clip as is described above, when the clip 40 is forced on a pair of stud bolts 15, 15 which are fixed downwardly through the floor 14 in advance while attempting to fit the bolt engagement holes 41, 41 in the clip 40 on the stud bolts 15, 15 so fixed, the locking claws 44 in the bolt engagement holes 41 are brought into engagement with threads on the stud bolts 15, whereby the clip 40 is fixed onto the floor 14, whereby the high-tension cable 7 is laid out along the underside of the floor 14.

Note that the clip 40 may be mounted at the crimped portion 31 of the protection pipe 30, and as this occurs, the positioning of the clip 40 can be facilitated.

Figure 5:
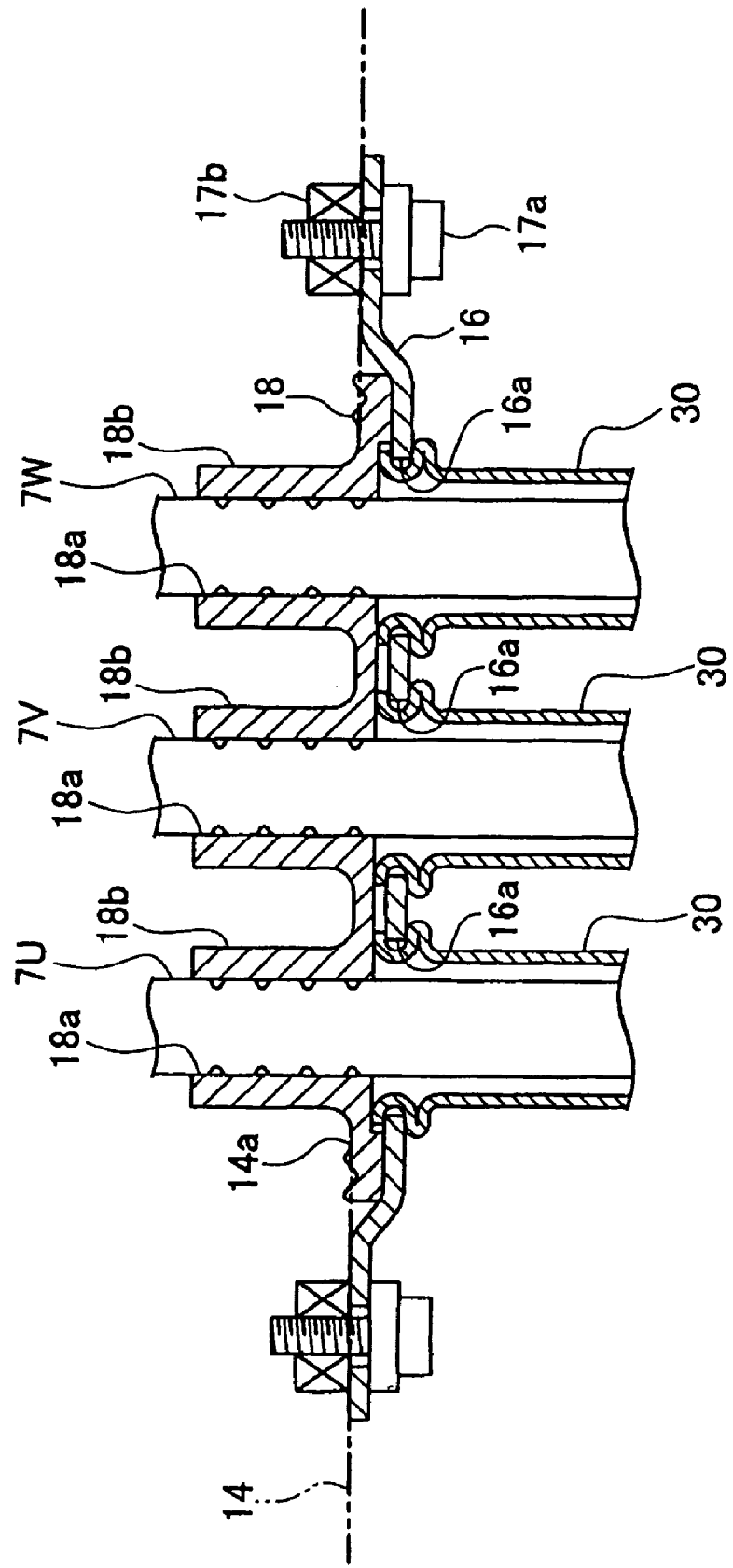
FIG. 5 is a cross-sectional view showing a state in which end portions of the protection pipes are treated according to the first embodiment.

As shown in FIG. 5, an end portion of the protection pipe 30 which faces the inverter 6 is fixed to a plate-like bracket 16.

To describe in detail, an oval through hole 14a is opened in the floor 14 at a position below the inverter 6 for allowing the high-tension cables 7U, 7V, 7W to pass therethrough, and furthermore, the plate-like bracket 16 is fixed to the floor 14 with bolts 17a and nuts 17b so as to close the through hole 14a. Three through holes 16a are formed in the bracket 16 in such a manner as to be aligned in parallel, and the end portion of the protection pipe 30 through which the high-tension cable 7 is already passed is inserted into each through hole 16a one by one, and the end portion of each protection pipe 30 is crimped to be fixed to the bracket 16 in such a manner as to hold an inner circumferential edge of the through hole 16a in the bracket 16 from both sides in an axial direction. In addition, a grommet 18 is held between the bracket 16 and the floor 14, and the high-tension cables 7U, 7V, 7W which protrude from the end portions of the protection cables 30 are passed through in a sealed fashion three through holes 18 formed in the grommet 18, respectively.

The end portions of the protection pipes 30 are fixed to the floor 14 as will be described below. Firstly, the respective end portions of the three protection pipes 30 through which the high-tension cables 7U, 7V, 7W are passed, respectively, are inserted into the through holes 16a in the bracket, respectively, and the end portions are crimped to be fixed to the inner circumferential edges of the respective through holes 16a. Next, the high-tension cables 7U, 7V, 7W which protrude from the end portions of the respective protection pipes 30 are passed through the through holes 18a in the grommet 18, respectively, so that the grommet 18 is allowed to hit the bracket 16 and the end portions of the protection pipes 30. Next, the high-tension cables 7U, 7V, 7W and tube portions 18b of the grommet 18 are inserted into the through holes 14a in the floor 14 from the bottom side of the floor 14 to produce a state in which a circumferential edge portion of the grommet 18 is held by the floor 14 and the bracket 16, and the bracket 16 is then fixed with the bolts 17a and the nuts 17b.

Thus, after the protection pipes 30 through which the high-tension cables 7U, 7V, 7W are passed are fixed to the floor 14, the high-tension cables 7U, 7V, 7W which protrude from the protection pipes 30 are connected to the inverter 6.

In addition, the other ends of the protection pipes 30 through which the high-tension cables 7 are passed are caused to rise into the engine compartment 11, and as shown in FIG. 2, end portions of the protection pipes 30 are crimped and fixed together by a cap 21. Then, the high-tension cables 7U, 7V, 7W which are exposed from the cap 21 are passed through the corrugated tube 20, and one end portion of the corrugated tube 20 is crimped into the cap 21, whereas the other end portion of the corrugated tube 20 is crimped and fixed to a terminal box (not shown) of the motor/generator 3, whereby the high-tension cables 7U, 7V, 7W are connected to the motor/generator 3 within the terminal box.

According to the vehicle power cables retaining structure of the first embodiment, the high-tension cables 7 can be simply laid out on the underside of the floor 14 of the hybrid vehicle 1, whereby the working efficiency in laying out the high-tension cables 7 is improved and hence the productivity is improved.

In addition, the protection pipe 30 protects the high-tension cable 7 against jumping pebbles and splashed water. Furthermore, the protection pipe having the rigidity prevents the deflection of the high-tension cable 7 that would occur due to its gravity and vibrations. In addition, the protection pipe cuts off the conduction of heat from the outside so as to protect the high-tension cable 7 against a damage that would be caused by heat.

Furthermore, since the protection tube 20 and the protection pipe have an electromagnetic shielding function, a non-shielding cable can be adopted for the high-tension cable 7, and as a result, the high-tension cable 7 can be made smaller in diameter and lighter in weight, thereby making it possible to make the protection tube 20 and the protection pipe 30 smaller in diameter and lighter in weight.

Figure 6:
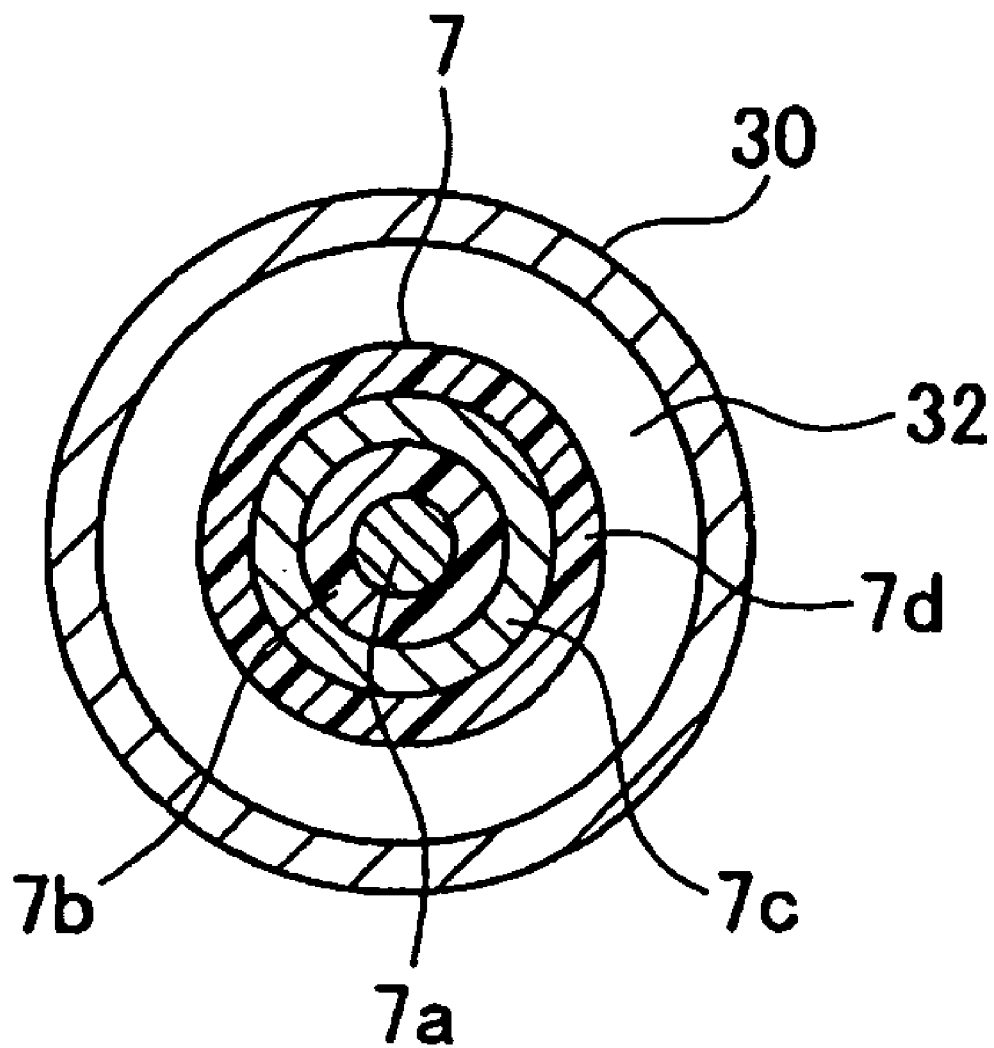
FIG. 6 is a cross-sectional view of the protection pipe through which a shielding cable is passed.

Note that while, in this embodiment, the non-shielding cable is adopted as the high-tension cable 7, a shielding cable can be used as the high-tension cable 7, the shielding cable including, as shown in FIG. 6, a conductor 7a, an insulating material 7b, an electromagnetic shielding wire 7c and an insulating material 7d. In this case, since the protection pipe 30 also has the electromagnetic shielding function, the noise preventing performance is enhanced.

In addition, since the connecting portions of the high-tension cables 7 to the motor/generator 3 are accommodated in the flexible corrugated tube 20, vibrations of the engine 2 can be absorbed by the corrugated tube 20 so as to eliminate a risk that the vibrations of the engine 2 are transmitted to the protection pipes 30 and hence to the inverter 6. Additionally, the tolerance in dimension in laying out the high-tension cables 7 can also be absorbed by the corrugated tube 20, the laying-out job is facilitated and hence the productivity is enhanced.

Note that even when an iron flexible tube having a net-like shielding portion is used for the corrugated tube 20, similar function and advantage to those provided when the corrugated tube 20 is used can be provided.

In addition, since the high-tension cable 7 can be disposed substantially on the axial center of the protection pipe 30 by providing the crimped portions 31 at several intermediate locations along the length of the protection pipe 30, the contact area between the high-tension cable 7 and the protection pipe 30 can be decreased markedly, thereby making it possible to prevent the high-tension cable 7 being damaged from the friction with the protection pipe 30. In addition, since the gap 32 is formed circumferentially equally between the high-tension cable 7 and the protection pipe 30, air residing within the gap 32 functions as a heat insulating layer, whereby the high-tension cable 7 is made difficult to be subjected to a damage caused by heat from the outside.

Figure 7:
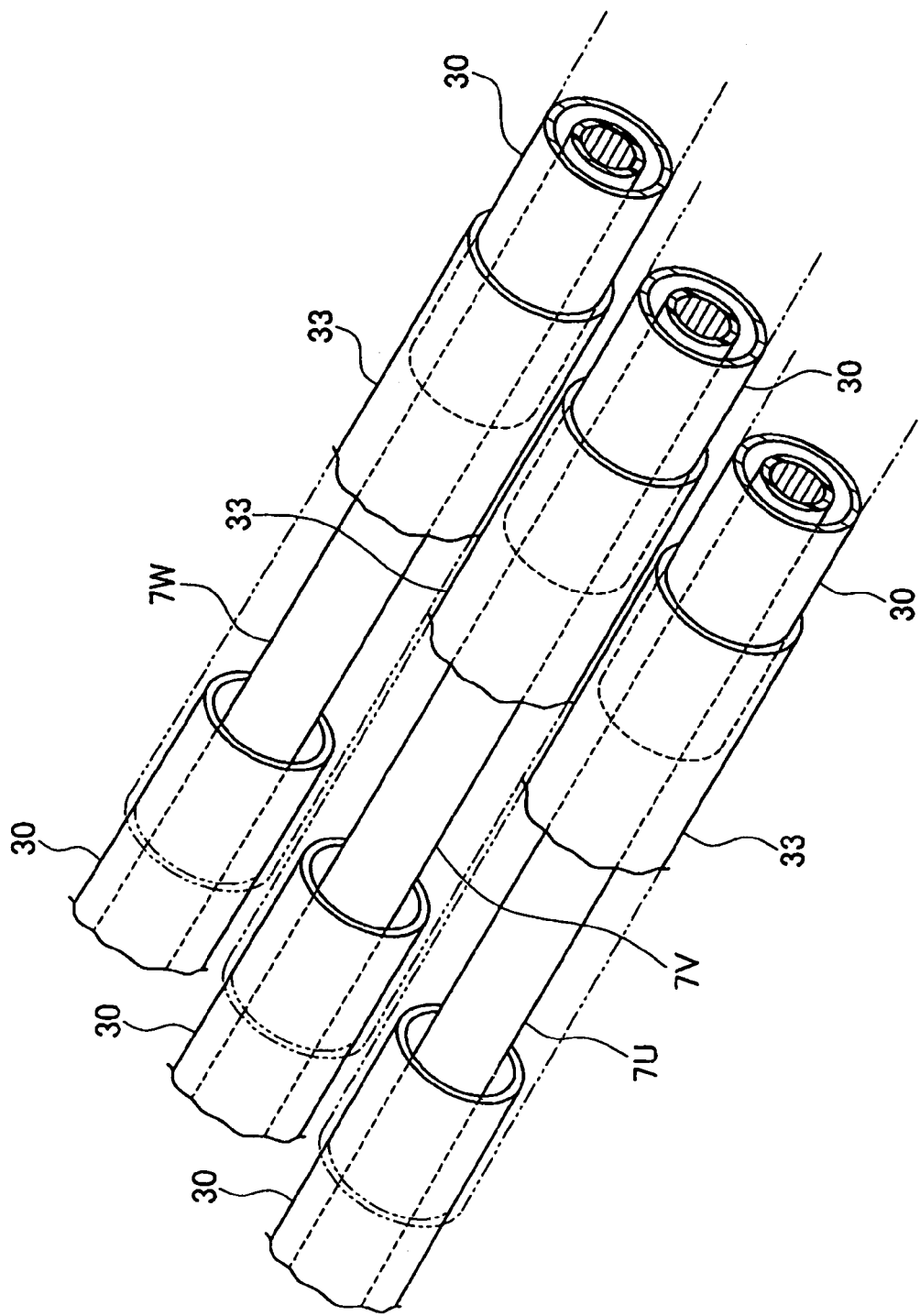
FIG. 7 is a perspective view showing connecting portions of divided protection pipes according to the first embodiment.

Note that while, in the embodiment, the protection pipes 30 through which the high-tension cables 7U, 7V, 7W in the respective phases are constructed as a single individual pipe, respectively, the protection pipes 30 through which the high-tension pipes 7U, 7V, 7W in the respective phases are passed may be each divided into a plurality of pipes, and the protection pipes 30 so divided may be connected to each other by an iron corrugated tube 33, as shown in FIG. 7. According to this construction, since the tolerance in dimension in laying out the high-tension cable 7 can be absorbed by the corrugated tube 33, the laying-out work can be facilitated further.

Note that even when the iron flexible tube having a net-like shielding portion is used for the corrugated tube 33, similar function and advantage to those provided when the corrugated tube 33 is used can be provided.

(Second Embodiment)

Next, a second embodiment of a vehicle power cables retaining structure according to the invention will be described. The vehicle power cables retaining structure according to the second embodiment differs from that according to the first embodiment only in that the gap 32 formed between the protection pipe 30 and the high-tension cable 7 is used as a cooling passageway so that cooling air (a refrigerant) is allowed to pass through the gap 32.

Thus, when cooling air is passed through the gap 32, since not only can the high-tension cable 7 be cooled but also the protection pipe 30 can be cooled, a heat damage caused from the outside a can be prevented in an ensured fashion. In addition, the high-tension cable 7 can be maintained at a predetermined temperature or lower by adjusting the flow rate and temperature of the cooling air.

Figure 8:
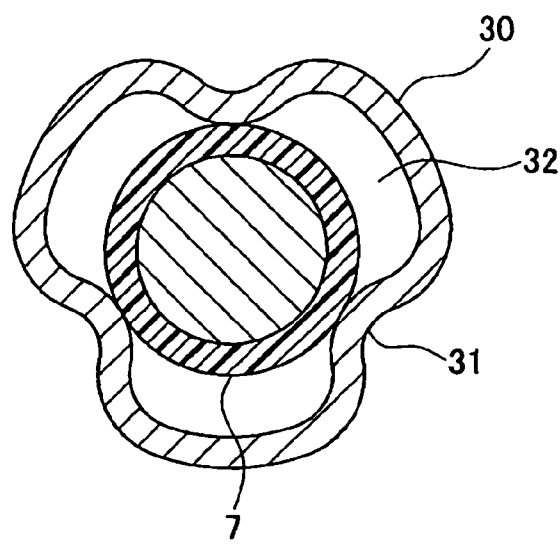
FIG. 8 is a cross-sectional view of a crimped portion of a protection pipe according to a second embodiment of a vehicle power cables retaining structure of the invention.

In addition, in a case where the gap 32 is used as the cooling passageway, since the cooling passageway is closed in the event that the protection pipe 30 is crimped completely there around when forming the crimped portions 31 on the protection pipe 30, for example, as shown in FIG. 8, the protection pipe 30 is crimped circumferentially at certain intervals so as to be crimped only at a plurality of locations, so that gaps 32 produced on axial sides of each crimped portion can open a communication, respectively. In this case, in order to disposed the high-tension cable 7 on the axial center of the protection pipe 30, it is preferable to crimp the protection pipe 30 at three or more circumferential locations.

Figure 9:
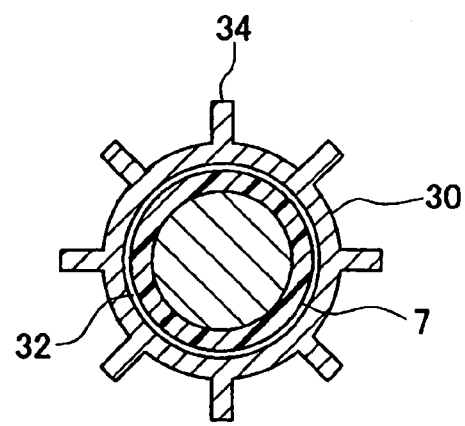
FIG. 9 is a cross-sectional view (part 1) of a protection pipe according to the second embodiment.
Figure 10:
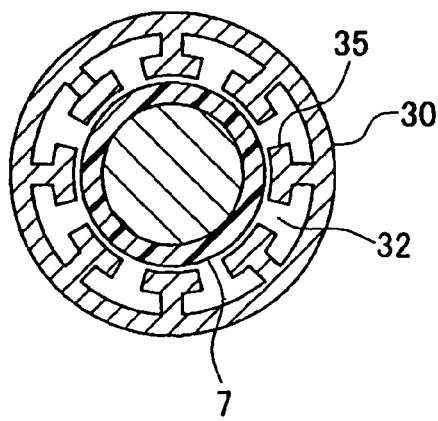
FIG. 10 is a cross-sectional view (part 2) of a protection pipe according to the second embodiment.
Figure 11:
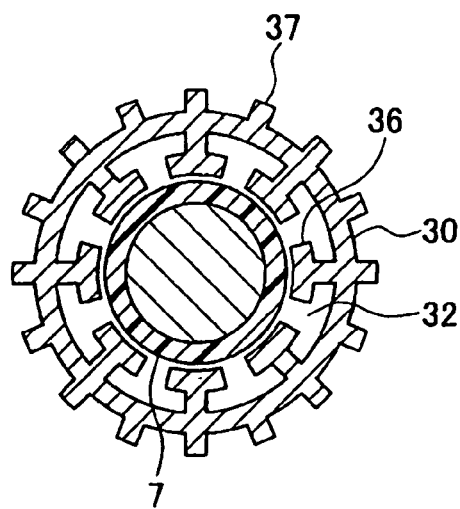
FIG. 11 is a cross-sectional view (part 3) of a protection pipe according to the second embodiment.

Modified examples of protection pipes 30 when using the gap 32 as the cooling passageway are shown in FIGS. 9 to 11.

An embodiment shown in FIG. 9 is an example where fins 34 are provided on an outer circumferential surface of a protection pipe 30 in such a manner as to protrude therefrom radially outwardly. When the fins 34 are provided on the outer circumferential surface of the protection pipe 30, the contact area with air or atmosphere flowing outside the protection pipe 30 is increased, a larger cooling effect can be provided on the protection pipe 30 by the atmosphere. In addition, since the cooling air is cooled via the protection pipe 30, a larger cooling effect can also be provided on the high-tension cable 7. Furthermore, the rigidity of the protection pipe 30 can be increased.

Note that there is imposed no limitation on the configuration, dimensions and number of the fins 34 so provided.

An embodiment shown in FIG. 10 is an example where fins 35 are provided on an inner circumferential surface of a protection pipe 30 in such a manner as to protrude therefrom radially inwardly. When the fins 35 are provided on the inner circumferential surface of the protection pipe 30, the contact area with air flowing through a gap 32 is increased, whereby a larger cooling effect can be provided on the high-tension cable 7 by the cooling air. Consequently, the high-tension cable 7 is made difficult to be subjected to a heat damage from the outside.

In particular, since the fins 35 in the embodiment shown in FIG. 10 are each formed so as to have a substantially T-shape which allows for a larger surface area, the cooling effect onto the protection pipe becomes extremely large. However, the configuration of the fin 35 is not limited to the T-shape but a variety of configurations may be adopted. In addition, the dimensions and number of fins 35 provided are not limited in any way.

In addition, the fins 35 increases the rigidity of the protection pipe 30.

An embodiment shown in FIG. 11 is an example where fins 36, 37 are provided both inner and outer surfaces of a protection pipe 30 in such a manner as to protrude therefrom. When the finds 36, 37 are provided on the inner circumferential surface and the outer circumference surface of the protection pipe 30, the contact areas with air flowing inside the protection pipe 30 (namely, through a gap 32) and the atmosphere flowing outside the protection pipe 30 are increased, whereby the cooling effect on the protection pipe 30 both by the cooling air and the atmosphere is increased. In addition, since the cooling air is cooled via the protection pipe 30, the cooling effect on the high-tension cable 7 is also increased. Additionally, the fins 36, 37 increase the rigidity of the protection pipe 30.

Note that there is no limitation imposed on the configuration, dimensions and number of the fins 36, 37 so provided.

(Other Embodiments)

Note that the invention is not limited to the embodiments that are described heretofore.

For example, while, in the embodiments, the inverter 6 is placed below the first seat 13, the inverter 6 may be placed below a second seat 13B or a third seat 13C, as shown by double-dashed lines in FIG. 1. Alternatively, the inverter 6 may be placed on the underside of the floor 14.

In addition, the power cables may be low-tension cables, and the vehicle power cables retaining structures according to the invention can be applied to a retaining structure for low-tension cables for connecting a DC/DC converter (a power converter) with a low-voltage battery (for example, a 12V-battery).

Furthermore, the invention can be applied not only to the hybrid vehicle but also an electric vehicle having only a motor as a power source.

As is described heretofore, according to the first aspect of the invention, there is provided a superior advantage that the power cables can be simply laid out on the underside of the floor of the vehicle and hence, the workability and productivity can be improved.

In addition, there is also provided a superior advantage that the protection pipes protects the power cables against jumping pebbles, splashed water and heat damages from the outside and prevents the deflection of the power cables. In addition, there is provided an advantage that non-shielding cables can be adopted as the power cables, and as a result, the power cables can be made smaller in diameter and lighter in weight, and hence the protection pipe can be made smaller in diameter and lighter in weight.

According to the second aspect of the invention, there is provided a superior advantage that the power cables can be simply laid out on the underside of the floor of the hybrid vehicle and hence the workability and productivity can be improved.

In addition, there is also provided an advantage that under the floor, the protection pipes protect the power cables against jumping pebbles, splashed water and heat damages from the outside and prevents the deflection of the power cables. In addition, there is provided an advantage that non-shielding cables can be adopted as the power cables, and as a result, the power cables can be made smaller in diameter and lighter in weight, and additionally, the protection pipe can be made smaller in diameter and lighter in weight.

On the other hand, since the portions of the power cables that connect to the motor in the engine compartment are passed through the flexible protection tube, vibrations such as resulting from the engine or the like can be absorbed by the protection tube, and therefore, there is caused no risk that the vibrations are transmitted to the protection pipes and hence to the inverter. In addition, since the tolerance in dimensions inlaying out the power cables can be absorbed by the protection tube, the power cable laying-out job is facilitated and hence the productivity is improved.

According to the third aspect of the invention, since the electromagnetic shielding function can be imparted to the protection tube, there is provided an advantage that non-shielding cables can be adopted as the power cables, and as a result, the power cable can be made smaller in diameter and lighter in weight, and additionally, the protection tube can also be made smaller in diameter and lighter in weight.

According to the fourth aspect of the invention, since the power cable can be passed through the protection pipe before the protection pipe is bent and the power cable and the protection pipe can be simultaneously formed into a configuration which follows a route along which the power cable is laid out, there is provided a superior advantage that the power cable laying-out job is facilitated.

According to the fifth aspect of the invention, since the power cable can be disposed substantially at the axial center of the protection pipe, there is provided an advantage that the contact area between the power cable and the protection pipe can be decreased markedly so that not only the power cable can be prevented from being damaged through a friction with the protection pipe but also that the power cable is made difficult to be subjected to a heat damage from the outside.

According to the sixth aspect of the invention, since the tolerance in dimension in laying out the power cables can be absorbed by the corrugated tube or the flexible tube which is used to connect the protection pipes each other, there is provided an advantage that the power cable laying out work is facilitated.

According to the seventh aspect of the invention, since not only the power cables but also the protection pipes can be cooled, there is provided an advantage that a heat damage caused from the outside can be prevented in an ensured fashion, and there is also provided an advantage that the power cables can be maintained at a predetermined temperature or lower by adjusting the flow rate and temperature of the refrigerant.

According to the eighth aspect of the invention, since the surface area of the protection pipe can be increased by providing the fins, there is provided an advantage that the cooling effect on the protection pipe can be increased, whereby the power cable is made difficult to be subjected to a heat damage from the outside. In addition, since the cooling air is also cooled via the protection pipe, there is provided an advantage that the cooling effect on the power cable can be increased. Furthermore, there is provided an advantage that the rigidity of the protection pipe can be enhanced.

According to the ninth aspect of the invention, since the surface area of the fins can be increased, there is provided an advantage that the cooling effect on the protection pipe can further be enhanced.

What is claimed is:

1. A vehicle power cables retaining structure for retaining power cables, comprising:
    power cables laid out along an underside of a floor of a hybrid vehicle which is driven to run by an engine and a motor;
    metallic protection pipes; and
    a flexible protection pipe,
    wherein the power cables connect a power converter disposed outside an engine compartment with the motor disposed inside the engine compartment,
    the power cables are individually passed through metallic protection pipes under the floor, and the metallic protection pipes are then supported from the underside of the floor, and
    in the engine compartment, the power cables are passed through a flexible protection tube,
    wherein at least one protection pipe is formed by being bent after the power cable is passed therethrough.

2. The vehicle power cables retaining structure as set forth in claim 1, wherein
    the protection tube includes an iron corrugated tube or an iron flexible tube having a net-like shield portion.

3. A vehicle power cables retaining structure, comprising:
    power cables laid out along an underside of a floor of an electric vehicle, and metallic protection pipes for passing the power cables individually therethrough,
    wherein the metallic protection pipes are then retained on the underside of the floor of the vehicle,
    wherein at least one protection pipe is decreased in diameter by crimping an intermediate portion along a length thereof.

4. A vehicle power cables retaining structure, comprising:
    power cables laid out along an underside of a floor of an electric vehicle, and metallic protection pipes for passing the power cables individually therethrough,
    wherein the metallic protection pipes are then retained on the underside of the floor of the vehicle,
    wherein the plurality of protection pipes are connected to each other by an iron corrugated tube or an iron flexible tube having a net-like shield.

5. The vehicle power cables retaining structure as set forth in claim 3, wherein
    a refrigerant is allowed to flow through a gap formed between at least one protection pipe and a corresponding power cable passing therethrough.

6. The vehicle power cables retaining structure as set forth in claim 5, further comprising:
    a fin provided on at least either of an inner surface or an outer surface of at least one protection pipe in such a manner as to protrude therefrom.

7. The vehicle power cables retaining structure as set forth in claim 6, wherein
    the fin has a T-shaped cross section.

8. The vehicle power cables retaining structure as set forth in claim 1, wherein
    at least one protection pipe is decreased in diameter by crimping an intermediate portion along a length thereof.

9. The vehicle power cables retaining structure as set forth in claim 1, wherein
    the plurality of protection pipes are connected to each other by an iron corrugated tube or an iron flexible tube having a net-like shield.

10. The vehicle power cables retaining structure as set forth in claim 1, wherein
    a refrigerant is allowed to flow through a gap formed between at least one protection pipe and a corresponding power cable passing therethrough.

11. The vehicle power cables retaining structure as set forth in claim 10, further comprising:
    a fin provided on at least either of an inner surface or an outer surface of at least one protection pipe in such a manner as to protrude therefrom.

12. The vehicle power cables retaining structure as set forth in claim 11, wherein
    the fin has a T-shaped cross section.

13. The vehicle power cables retaining structure as set forth in claim 4, wherein a refrigerant is allowed to flow through a gap formed between at least one protection pipe and a corresponding power cable passing therethrough.

14. The vehicle power cables retaining structure as set forth in claim 13, further comprising:
    a fin provided on at least either of an inner surface or an outer surface of at least one protection pipe in such a manner as to protrude therefrom.

15. The vehicle power cables retaining structure as set forth in claim 14, wherein the fin has a T-shaped cross section.

* * * * *